(12) United States Patent
Longwell et al.

(10) Patent No.: US 8,096,582 B2
(45) Date of Patent: Jan. 17, 2012

(54) CARRIER RACK

(75) Inventors: Kelly Ann Longwell, Marysville, OH (US); Matthew J. Alexander, Hilliard, OH (US); Travis Barkey, Dublin, OH (US); Timothy Adam Hahn, Woodstock, OH (US); Stephen George Hlopick, Marysville, OH (US); Yoshiaki Noda, Dublin, OH (US); Thomas Howerton Pollock, Powell, OH (US)

(73) Assignee: Honda Motor Company, Ltd., Tokyo (JP)

( * ) Notice: Subject to any disclaimer, the term of this patent is extended or adjusted under 35 U.S.C. 154(b) by 302 days.

(21) Appl. No.: 12/473,430

(22) Filed: May 28, 2009

(65) Prior Publication Data

US 2010/0301592 A1 Dec. 2, 2010

(51) Int. Cl.
*B60R 9/06* (2006.01)
*B60R 7/00* (2006.01)

(52) U.S. Cl. ........................... 280/769; 224/401

(58) Field of Classification Search .................. 280/769; 224/401, 400, 402–572; D12/107, 407; 296/3
See application file for complete search history.

(56) References Cited

U.S. PATENT DOCUMENTS

| | | | | |
|---|---|---|---|---|
| 4,176,771 A * | 12/1979 | Dubroc, Sr. | ................... | 224/412 |
| D363,267 S * | 10/1995 | Gustavsen | ................... | D12/407 |
| D364,140 S * | 11/1995 | Gustavsen | ................... | D12/407 |
| 5,636,885 A * | 6/1997 | Hummel | ....................... | 293/115 |
| 5,842,732 A * | 12/1998 | Daggett et al. | ................ | 296/102 |
| 6,016,943 A | 1/2000 | Johnson et al. | | |
| 6,186,571 B1 * | 2/2001 | Burke | ............................... | 296/3 |
| 6,394,326 B1 | 5/2002 | Lanier | | |
| 7,044,526 B2 * | 5/2006 | Tweet et al. | ....................... | 296/3 |
| 7,165,702 B1 | 1/2007 | Billberg | | |
| D606,905 S * | 12/2009 | Yao | .............................. | D12/107 |
| 7,854,460 B2 * | 12/2010 | Tweet et al. | ................ | 296/65.03 |
| 2005/0180835 A1 | 8/2005 | Schneider | | |
| 2005/0205628 A1 | 9/2005 | Lehmann | | |
| 2006/0054648 A1 * | 3/2006 | Maguire et al. | ............... | 224/401 |
| 2007/0000960 A1 | 1/2007 | Hanafusa et al. | | |
| 2007/0045368 A1 | 3/2007 | Lavelle | | |
| 2007/0175937 A1 | 8/2007 | Caldwell | | |

FOREIGN PATENT DOCUMENTS

GB 415519 A 8/1934

OTHER PUBLICATIONS

European Search Report, European Application No. 10160572.3-1523 / 2255999, mailed on Jan. 21, 2011, 5 pages.
Webpage photo depicting Biker's Choice Bobtail Luggage Rack [online]. Known to be in the public domain at least as early as Feb. 9, 2009. Retrieved from the Internet: <URL:www.babbittsonline.com>.
European Patent Office, European Office Action, European Patent Application No. 10 160 572.3-1523, Aug. 25, 2010, 3 pages.

* cited by examiner

*Primary Examiner* — J. Allen Shriver, II
*Assistant Examiner* — James M Dolak
(74) *Attorney, Agent, or Firm* — Ulmer & Berne, LLP

(57) ABSTRACT

A carrier rack for a vehicle is provided that includes a tubular frame member and a plurality of strapping members. The tubular frame member includes at least four corner portions and defines an outer perimeter of the carrier rack and also defines a carrier plane. Each of the strapping members is secured to a respective one of the corner portions, and is spaced apart from the carrier plane and positioned entirely interior of the outer perimeter of the carrier rack. The carrier plane is generally horizontally oriented, and each of the strapping members is below the carrier plane, when the carrier rack is attached to a vehicle and oriented to carry objects.

23 Claims, 10 Drawing Sheets

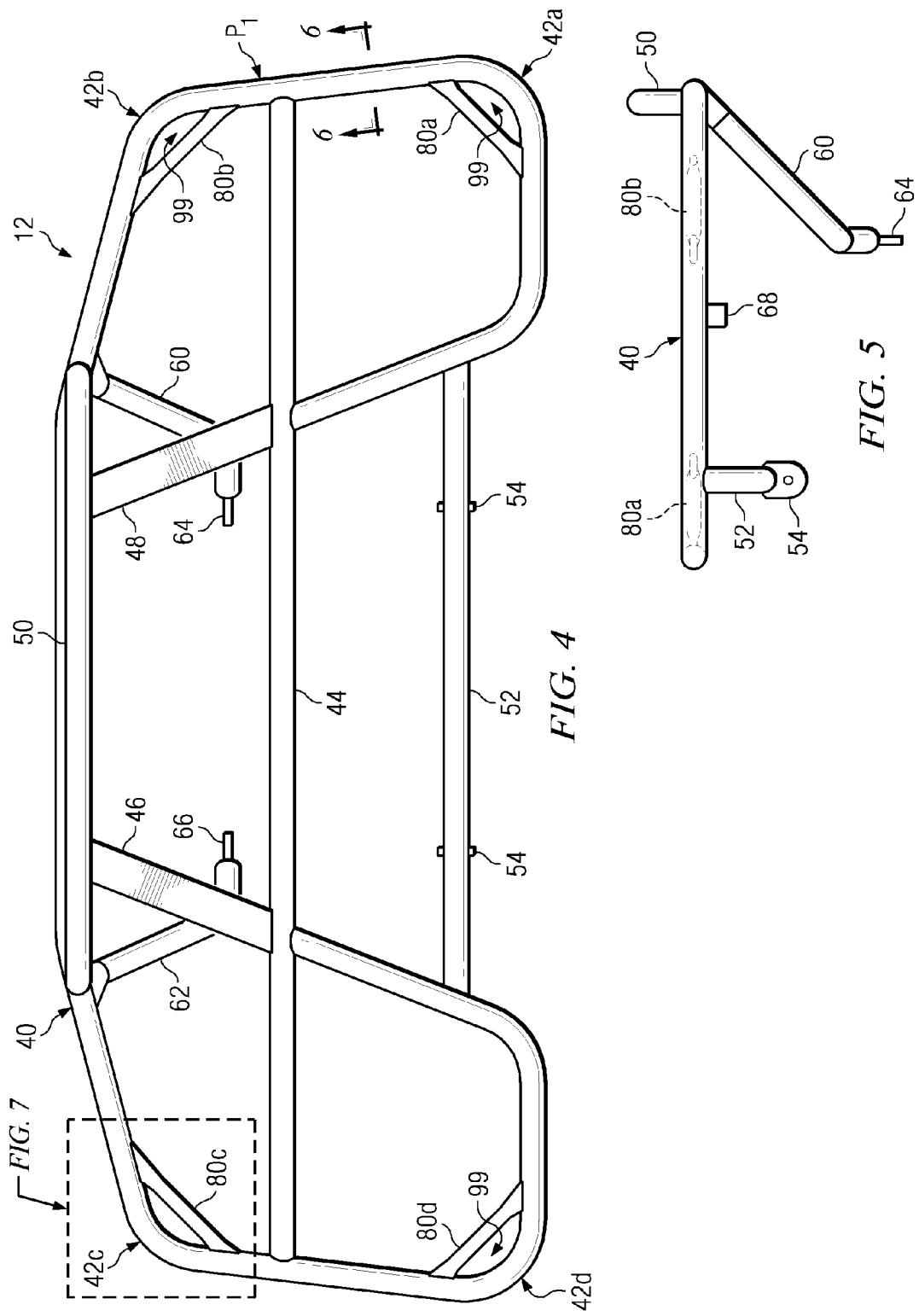

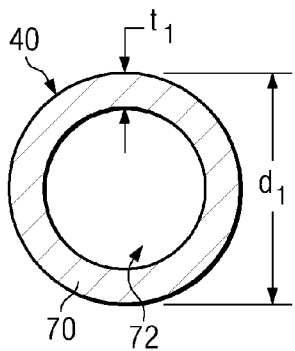
FIG. 6
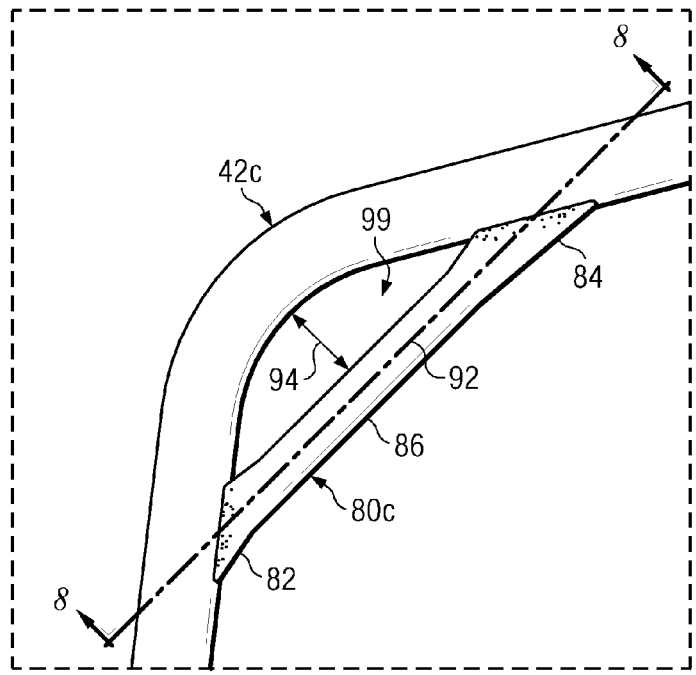
FIG. 7
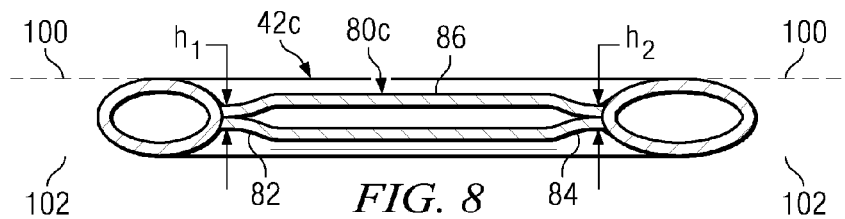
FIG. 8
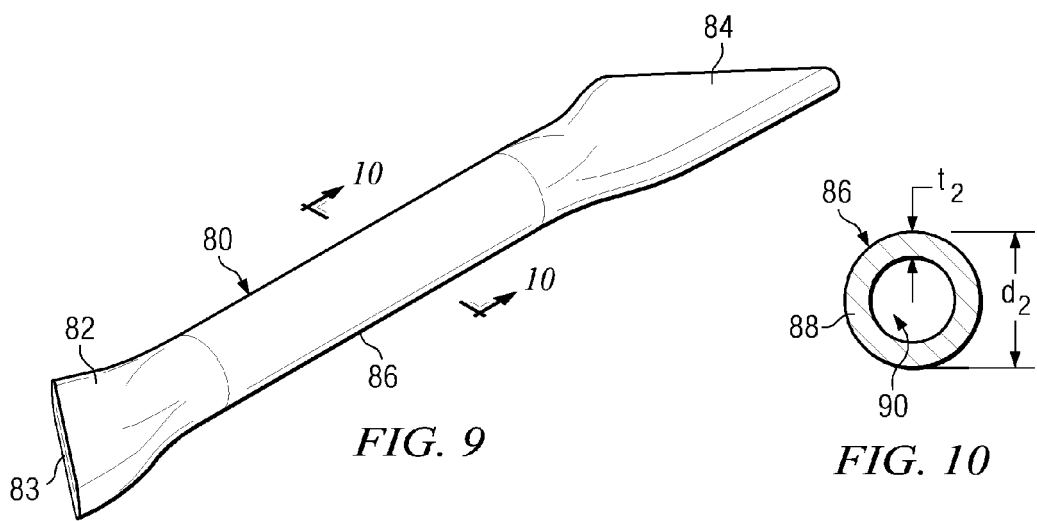
FIG. 9
FIG. 10

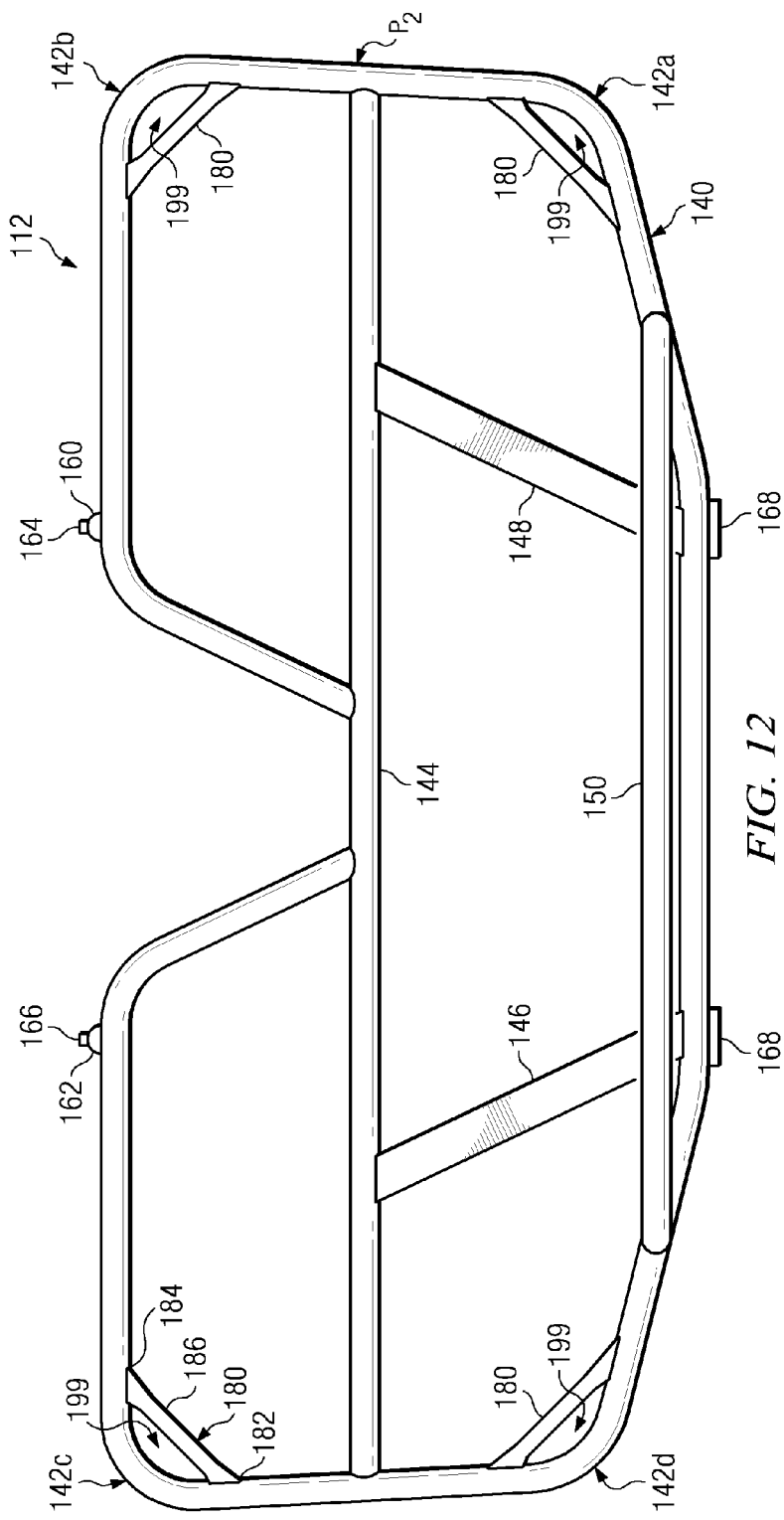
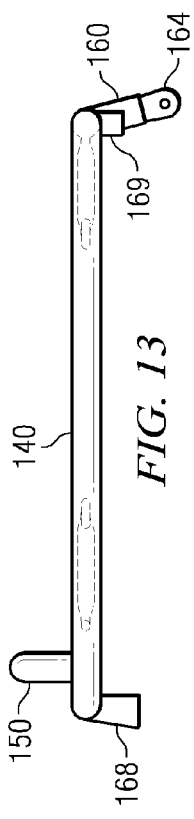
FIG. 12
FIG. 13

CARRIER RACK

TECHNICAL FIELD

The present invention relates generally to devices used to carry objects and more particularly, to a carrier rack for a vehicle.

BACKGROUND

Various vehicles, such as all terrain vehicles, can include one or more carrier racks mounted on the body of the vehicle. For example, known all terrain vehicles can include a first carrier rack mounted on a front fender assembly of the vehicle and a second carrier rack mounted on a rear fender assembly of the vehicle. The carrier racks often include a plurality of interconnected elongated members that define a plurality of openings.

The carrier racks can be used to transport various items that can be secured to the respective carrier rack with one or more straps, cords, or the like. However, conventional carrier racks used on all terrain vehicles can lack convenient locations to attach the straps, cords or the like for holding the items to the carrier racks. Also, the location and configuration of the features used to attach the straps, cords or the like, can adversely affect the achievable variation in size of the items to be secured and transported.

Prior Art FIGS. 14, 15 and 16 illustrate conventional carrier racks having various configurations. FIG. 14 illustrates a conventional carrier rack 212 that is attached to a front fender assembly 224 of an all terrain vehicle 210. The carrier rack 212 includes a tubular frame member 240 that defines an outer perimeter of the carrier rack 212. FIG. 15 illustrates a conventional carrier rack 312 that is attached to a front fender assembly 324 of all terrain vehicle 310. The carrier rack 312 includes a tubular frame member 340 that defines an outer perimeter of the carrier rack 312. FIG. 16 illustrates a carrier rack 412 that includes a base 413 that is attached to a rear fender assembly 426 of an all terrain vehicle 410. The carrier rack 412 includes a pair of rear mount assemblies 465 that are bolted (using fasteners not shown) to the base 413 and are secured at an upper end to a tubular frame member 440. Carrier rack 412 includes a pair of strapping members 480 that are welded to the forward ends of opposite side portions of the tubular frame member 440, with the forward ends of the tubular frame member 440 being supported by base 413. As will be appreciated with reference to FIG. 16, the strapping members 480 are generally vertically extending. Each of the strapping members 480 is a solid rod and has a substantially uniform shape throughout its length.

SUMMARY

According to one embodiment, a carrier rack for a vehicle is provided that includes a tubular frame member and a plurality of strapping members. The tubular frame member includes at least four corner portions and defines an outer perimeter of the carrier rack. Each of the corner portions partially defines the outer perimeter. Each of the strapping members includes a first end portion, a second end portion and a tubular portion intermediate the first and second end portions. Each of the strapping members is secured, at each of the first and second end portions, to a respective one of the corner portions of the tubular frame member and is positioned entirely interior of the outer perimeter of the carrier rack. Each of the strapping members cooperates with the respective one of the corner portions of the tubular frame member to define a corner opening. The tubular frame member defines a carrier plane. Each of the strapping members is spaced apart from the carrier plane. The carrier plane is generally horizontally oriented, and each of the strapping members is below the carrier plane, when the carrier rack is attached to a vehicle and oriented to carry objects.

According to another embodiment, a vehicle is provided that includes a frame, a body structure supported by the frame, and a carrier rack supported by at least one of the frame and the body structure. The carrier rack includes a tubular frame member and a plurality of strapping members. The tubular frame member includes at least four corner portions and defines an outer perimeter of the carrier rack. Each of the corner portions partially defines the outer perimeter. Each of the strapping members includes a first end portion, a second end portion and a tubular portion intermediate the first and second end portions. Each of the strapping members is secured, at each of the first and second end portions, to a respective one of the corner portions of the tubular frame member and is positioned entirely interior of the outer perimeter of the carrier rack. Each of the strapping members cooperates with the respective one of the corner portions of the tubular frame member to define a corner opening. The tubular frame member defines a carrier plane. The carrier plane is generally horizontally oriented, and each of the strapping members is below the carrier plane.

According to another embodiment, a saddle-type vehicle is provided and includes a frame, at least one rotatable front wheel coupled to the frame, at least one rotatable rear wheel coupled to the frame, a source of motive power, a body structure and a carrier rack. The source of motive power is supported by the frame and coupled to at least one of the front and rear wheels. The body structure is supported by the frame and includes a fender assembly. The fender assembly is adjacent to at least one of the front and rear wheels. The carrier rack is supported by at least one of the frame and the body structure and is adjacent to the fender assembly. The carrier rack includes a tubular frame member and a plurality of strapping members. The tubular frame member includes at least four corner portions and defines an outer perimeter of the carrier rack. Each of the corner portions partially defines the outer perimeter. Each of the strapping members is generally straight and includes a first end portion, a second end portion and a tubular portion intermediate the first and second end portions. The first end portion and the second end portion of each of the strapping members is welded to a respective one of the corner portions of the tubular frame member and is positioned entirely interior of the outer perimeter of the carrier rack. Each of the strapping members cooperates with the respective one of the corner portions of the tubular frame member to define a corner opening. The tubular frame member defines a carrier plane and a lower plane. The carrier plane is generally horizontally oriented and each of the strapping members is below the carrier plane and above the lower plane. Each of the strapping members further includes a longitudinal axis. For each of the strapping members, a maximum distance between the longitudinal axis and the respective corner portion, as measured in a direction substantially perpendicular to the longitudinal axis, ranges from about 19 mm to about 35 mm. The tubular frame member includes a first outside cross-sectional dimension. The tubular portion of each of the strapping members includes a second outside cross-sectional dimension. For each of the strapping members, a ratio of the first outside cross-sectional dimension to the second outside cross-sectional dimension ranges from about 1.5 to about 2.0. The tubular frame member has a first generally circular cross-sectional shape and includes a first annular wall defining a first hollow interior. The first annular wall has a first thickness. The tubular portion of each of the strapping members has a second generally circular cross-sectional shape and includes a second annular wall defining a second hollow interior. The second annular wall has a second thickness. The first outside cross-sectional dimension is an outside diameter of the tubular frame member and, for each of the strapping members, the second outside cross-sectional dimension is an outside diameter of the tubular portion. The first end portion of each of the strapping members has a first distal height. The second end portion of each of the strapping members has a second distal height. For each of the strapping members, each of the first distal height and the second distal height is less than the second outside cross-sectional dimension. For each of the strapping members, a ratio of the first thickness of the first annular wall of the tubular frame member to the first distal height ranges from about 0.5 to about 0.7. For each of the strapping members, a ratio of the first thickness of the first annular wall of the tubular frame member to the second distal height ranges from about 0.5 to about 0.7.

BRIEF DESCRIPTION OF THE DRAWINGS

Various embodiments according to the inventive principles will become better understood with regard to the following description, appended claims and accompanying drawings wherein:

FIG. 4 is a top plan view of the carrier rack shown in FIG. 3;

FIG. 5 is a left side elevation view of the carrier rack shown in FIGS. 3 and 4.

FIG. 6 is a cross-sectional view taken along line 6-6 in FIG. 4;

FIG. 7 is an enlarged view of the encircled portion of FIG. 4;

FIG. 8 is a cross-sectional view taken along line 8-8 in FIG. 7; and

FIG. 9 is a perspective view of the strapping member shown in FIGS. 7 and 8;

FIG. 10 is a cross-sectional view taken along line 10-10 in FIG. 9;

FIG. 12 is a top plan view of the carrier rack shown in FIG. 11;

FIG. 13 is a left side elevation view of the carrier rack shown in FIGS. 11 and 12;

DETAILED DESCRIPTION

Figure 1:
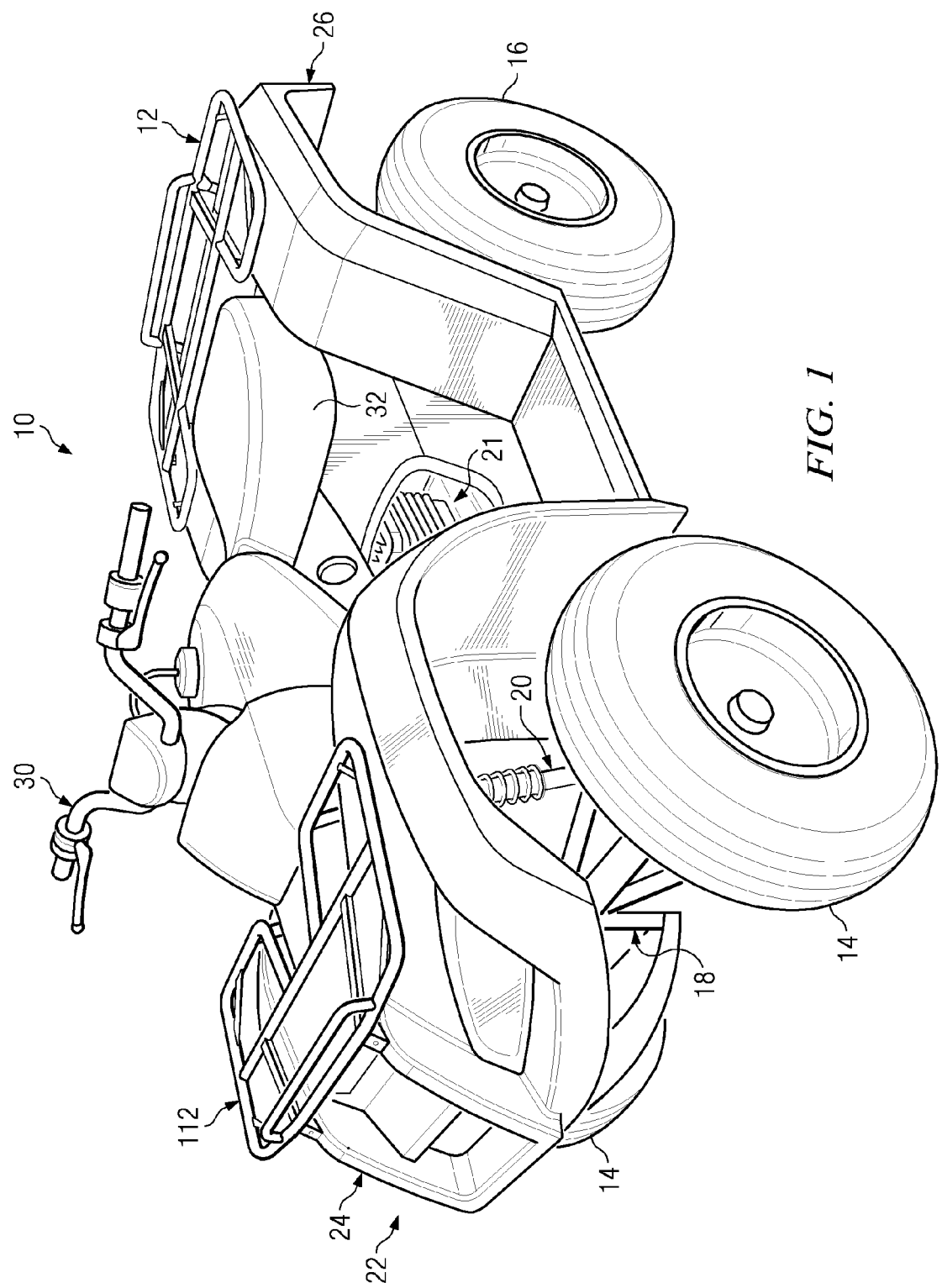
FIG. 1 is a perspective view of a vehicle that includes a carrier rack according to one embodiment secured to a forward portion of the vehicle, and that also includes a carrier rack according to another embodiment secured to a rear portion of the vehicle.
Figure 2:
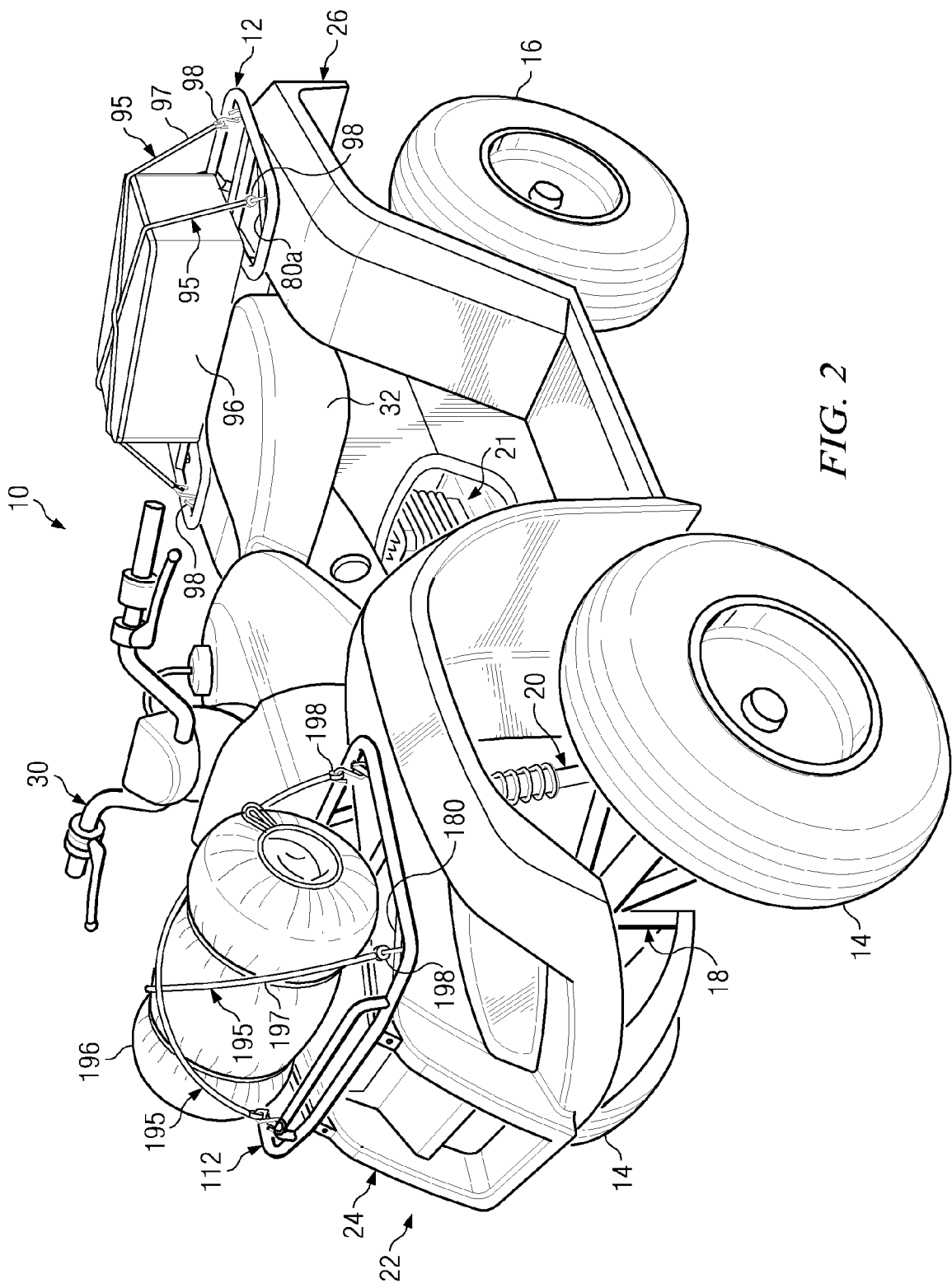
FIG. 2 is a perspective view of the vehicle shown in FIG. 1, but with cargo to be transported secured to each of the carrier racks.

Referring to the drawings, wherein like numbers indicate the same or corresponding elements throughout the views, FIGS. 1 and 2 illustrate a vehicle 10 that includes a carrier rack 12 according to one embodiment and further includes a carrier rack 112 according to another embodiment. Carrier racks according to the inventive principles can be used with a saddle-type vehicle such as vehicle 10, which is shown to be an ATV in FIGS. 1 and 2, or with a variety of other land, water, or other vehicles.

Vehicle 10 can include two rotatable front wheels 14 and two rotatable rear wheels 16 (one shown). The front wheels 14 and rear wheels 16 can be suspended from a frame 18 and are coupled to frame 18. The front wheels 14 can be suspended from frame 18 using a variety of conventional suspension systems, such as suspension system 20 shown partially in FIGS. 1 and 2. Vehicle 10 can further include a source of motive power (illustrated generally at 21 in FIGS. 1 and 2), which can be an internal combustion engine and/or an electric motor or any other suitable source of motive power. The source of motive power can be coupled to the front wheels 14 and/or the rear wheels 16. For example, the source of motive power can be drivingly connected to a drivetrain (not shown) that is operable for transferring torque to the front wheels 14 and/or the rear wheels 16.

Vehicle 10 can also include a body 22 that can be supported by frame 18. The body 22 can include a front fender assembly 24 and a rear fender assembly 26. As shown in FIGS. 1 and 2 with respect to the left front wheel 14 and the left rear wheel 16, the front fender assembly 24 can be adjacent to and at least partially cover each of the front wheels 14, and the rear fender assembly 26 can be adjacent to and at least partially cover each of the rear wheels 16. Vehicle 10 can further include a handlebar assembly 30 coupled to the front wheels 14, which can be used by an operator of vehicle 10 to steer the front wheels 14. Vehicle 10 can further include a seat 32 that can be used to support an operator of vehicle 10.

Figure 3:
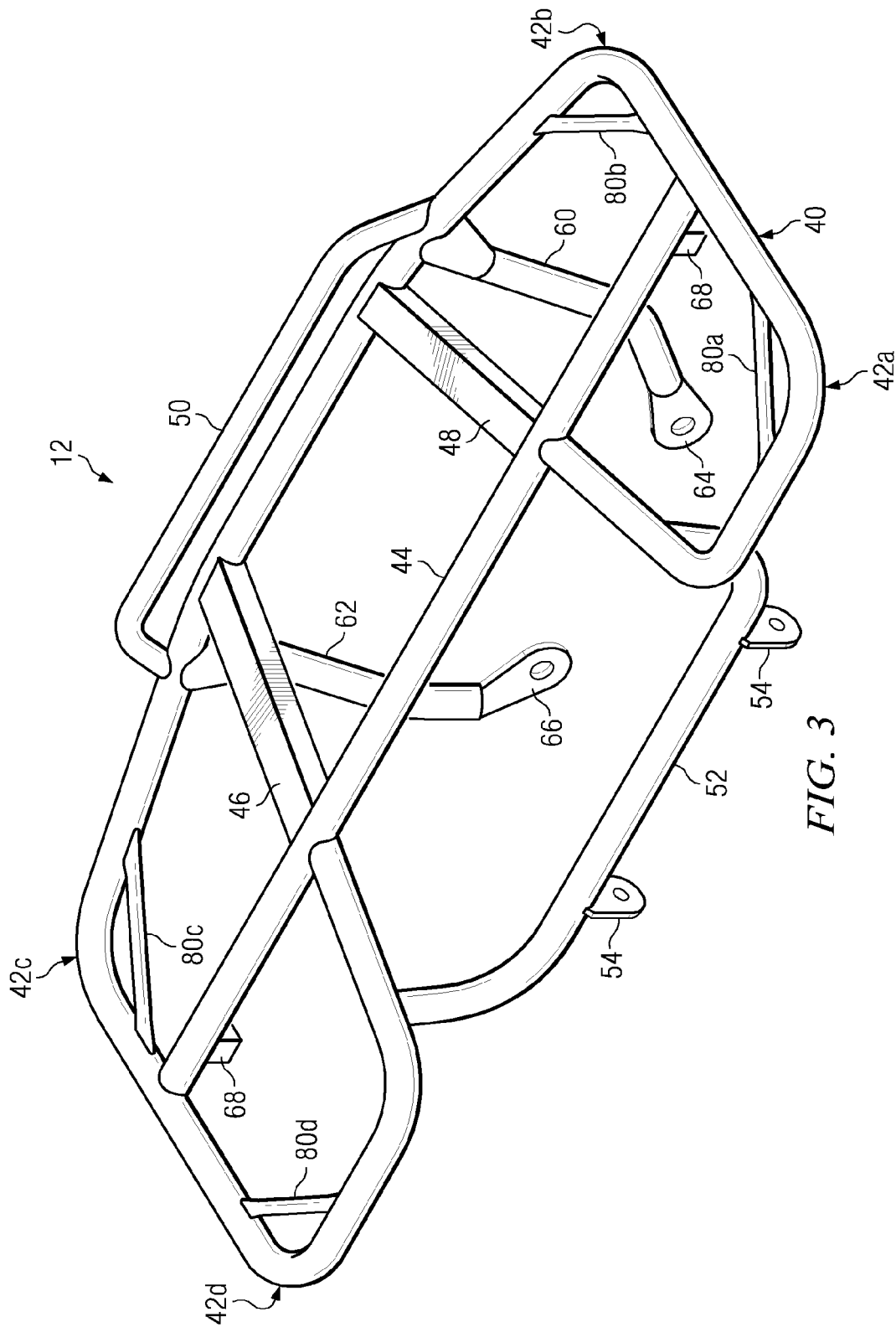
FIG. 3 is a perspective view of the carrier rack shown in FIGS. 1 and 2 that is secured to the rear portion of the vehicle.

The carrier rack 12 can be supported by frame 18 and/or the rear fender assembly 26 and can be positioned adjacent the rear fender assembly 26 as shown in FIGS. 1 and 2. Referring to FIGS. 1-8, the carrier rack 12 can include a tubular frame member 40 that defines an outer perimeter $P_1$ (FIG. 4) of the carrier rack 12. Tubular frame member 40 can include a plurality of corner portions. As shown in FIGS. 3 and 4, the tubular frame member 40 can include four corner portions, which are designated 42a, 42b, 42c and 42d in FIGS. 3 and 4. Each of the corner portions 42a, 42b, 42c and 42d can partially define the outer perimeter $P_1$. Carrier rack 12 can also include other members, that can be tubular members having various cross-sectional shapes, which are interconnected with one another and with the tubular frame member 40. For example, as shown in FIGS. 3 and 4, carrier rack 12 can include a tubular cross member 44 that extends laterally between opposite side portions of the tubular frame member 40. Each end of the tubular cross member 44 can be secured to the tubular frame member 40 by conventional means. For example, each end of the tubular cross member 44 can be welded to the tubular frame member 40. Carrier rack 12 can also include generally longitudinally extending members 46 and 48, which can be tubular members, with one end of each of the generally longitudinally extending members 46, 48 being secured, for example by welding, to the tubular frame member 40, and the opposite end of each of the generally longitudinal extending members 46, 48 being secured, for example by welding, to the tubular cross member 44.

A laterally extending rear tubular member 50 can be secured at opposite ends to the tubular frame member 40, for example by welding, and can extend above the tubular frame member 40 as shown in FIGS. 1, 3 and 5. The rear tubular member 50 can act as a stop to facilitate preventing cargo carried by the carrier rack 12 from moving rearward off of the carrier rack 12. Carrier rack 12 can also include a generally laterally extending, forward tubular cross member 52, with each end of the cross member 52 being secured, for example by welding, to the tubular frame member 40. The forward tubular cross member 52 can extend downwardly from the tubular frame member 40 as shown in FIGS. 3 and 5. A pair of mount brackets 54 can be secured to the forward tubular cross member 52 and can be used to attach the carrier rack 12 to the body 22 and/or the frame 18 of vehicle 10. For example, brackets 54 can be used to attach the carrier rack 12 to the rear fender assembly 26 or to the frame 18 of the vehicle 10. This can be achieved in any suitable manner. For example, conventional male fasteners can extend through apertures defined by mount brackets 54 and through apertures defined by mating mount brackets (not shown) secured to the rear fender assembly 26 and/or frame 18, and can be secured with conventional female fasteners. In another embodiment, the male fasteners can be threaded into a structure that is part of, or integral with, the rear fender assembly 26 or frame 18 and includes mating internal threads.

Carrier rack 12 can also include rear mount arms 60 and 62 which can be secured at one end, for example by welding, to the tubular frame member 40 and can extend downwardly from the tubular frame member 40. The mount arms 60 and 62 can terminate in distal eyelets 64 and 66, respectively. The distal eyelets 64, 66 can also be used to attach carrier rack 12 to the rear fender assembly 26 and/or frame 18. For example, each distal eyelet 64, 66 can define an aperture which can be sized and configured to receive a male fastener (not shown), which can also extend through an aperture defined by a mating bracket (not shown) secured to the rear fender assembly 26 and/or frame 18, with the male fastener secured by a conventional female fastener such as a nut. A pair of spacers 68 can be secured to, and may extend downwardly from, the tubular cross member 44. Each spacer 68 can engage and/or be secured to the rear fender assembly 26 and/or frame 18.

The tubular frame member 40 can be made from round tubing, such that the tubular frame member 40 has a generally circular cross-sectional shape, as shown in FIG. 6. In other embodiments, tubular frame members can be provided that are made from tubes having other cross-sectional shapes, such as square or rectangular cross-sectional shapes. Tubular frame member 40 can include an outside cross-sectional dimension, which, in the embodiment shown in FIG. 6, is an outside diameter $d_1$ of the tubular frame member 40. The tubular frame member 40 can include an annular wall 70 that defines a hollow interior 72 and has a thickness $t_1$. In one embodiment, the outside diameter $d_1$ of the tubular frame member 40 can range from about 20 mm to about 24 mm. In another embodiment, the outside diameter $d_1$ can be about 22.2 mm. In one embodiment, the thickness $t_1$ of the annular wall 70 can range from about 1.2 mm to about 1.6 mm. In one embodiment, the thickness $t_1$ can be about 1.4 mm.

The carrier rack 12 can include a plurality of strapping members 80 (one shown in FIG. 9). Each of the strapping members 80 can be secured to a respective one of the corner portions of the tubular frame member 40 at a position that is entirely interior of the outer perimeter $P_1$ of carrier rack 12, as shown for example in FIG. 4. In particular, a first one of the strapping members 80, designated 80a, can be secured to the corner portion 42a of the tubular frame member 40, a second one of the strapping members 80, designated 80b, can be secured to the corner portion 42b, a third one of the strapping members 80, designated 80c, can be secured to the corner portion 42c, and a fourth one of the strapping members 80, designated 80d, can be secured to the corner portion 42d. As shown in FIG. 9, each of the strapping members 80 can include a first end portion 82, a second end portion 84, and a tubular portion 86 intermediate the first and second end portions 82, 84 and integral with each of the first and second end portions 82, 84. The first and second end portions 82, 84 and the tubular portion 86 can be made as a unitary structure. As shown in FIG. 10, the tubular portion 86 of each strapping member 80 can have a generally circular cross-sectional shape and can include an outside cross-sectional dimension, which can be an outside diameter $d_2$ of the tubular portion 86 of strapping member 80. The tubular portion 86 of strapping member 80 can include an annular wall 88 that defines a hollow interior 90 and has a thickness $t_2$. In one embodiment, the outside diameter $d_2$ of the tubular portion 86 of strapping member 80 can range from about 10.0 mm to about 14.0 mm. In another embodiment, the outside diameter $d_2$ can be about 12.0 mm. In one embodiment, the thickness $t_2$ of the annular wall 88 can range from about 1.0 mm to about 1.4 mm. In another embodiment, the thickness $t_2$ can be about 1.2 mm.

The first end portion 82 and the second end portion 84 of each strapping member 80 can be secured to a respective corner portion of the tubular frame member 40. For example, as shown in FIGS. 7 and 8 with respect to strapping member 80c, the first end portion 82 and second end portion 84 of the strapping member 80c can be secured to the corner portion 42c of the tubular frame member 40. The first end portion 82 and the second end portion 84 can each be welded to the corner portion 42c. In order to facilitate welding each of the strapping members 80 to the respective corner portion, such as corner portion 42c shown in FIGS. 7 and 8, each of the first and second end portions 82, 84 can be crimped or stamped, such that a distal end of each of the end portions is substantially flattened and has a distal height that is less than the outside diameter $d_2$ of the tubular portion 86 of strapping member 80. For example, the first end portion 82 of each strapping member 80 can have a distal height $h_1$ (shown in FIG. 8 with respect to strapping member 80c) that is smaller than the outside diameter $d_2$ (FIG. 10) of the tubular portion 86 of strapping member 80. Similarly, the second end portion 84 of each strapping member 80 can have a distal height $h_2$ (shown in FIG. 8 with respect to strapping member 80c) which is smaller than the outside diameter $d_2$ of the tubular portion 86 of strapping member 80.

A distal end surface of each of the end portions 82, 84 can be elongated and substantially flat, as shown in FIG. 9 with respect to a distal end surface 83 of the end portion 82. The configuration of distal end surface 83 in cooperation with the distal height $h_1$, which is less than the outside diameter $d_1$ of the tubular frame member 40, facilitates efficient welding of the end portion 82 of each strapping member 80 to the respective corner portion of the tubular frame member 40, such as corner portion 42c shown in FIGS. 7 and 8. Similarly, the configuration of the distal end surface of end portion 84 in cooperation with distal height $h_2$, which is less than the outside diameter $d_1$ of the tubular frame member 40, facilitates efficient welding of the end portion 84 of each strapping member 80 to the respective corner portion of the tubular frame member 40, such as corner portion 42c shown in FIGS. 7 and 8. The substantially flat distal end surface 83 of the end portion 82 and the substantially flat distal end surface of the end portion 84 improve the strength of the associated welds as compared to the weld strength that can be achieved when welding a wire or solid rod to a tubular member.

As shown in FIG. 7 with respect to strapping member 80c, each strapping member 80 can have a longitudinal axis 92. The strapping member 80 can be sized such that a maximum distance 94 between the tubular portion 86 and the respective corner portion, such as corner portion 42c shown in FIG. 7, as measured in a direction substantially perpendicular to the longitudinal axis 92, ranges from about 19 mm to about 35 mm. The range in magnitude of the maximum distance 94 permits a conventional hook, clasp or the like, that is attached at one end to a tie-down member such as a strap, cord, or the like, to engage and be releasably secured to the strapping member 80. For example, as shown in FIG. 2, two tie-down members 95 can be used to secure cargo 96 to the carrier rack 12. Cargo 96 can be a box as shown in FIG. 2 or any of a wide variety of other items. Each tie-down member 95 can include a strap 97 and a pair of generally S-shaped hooks 98, with one of the hooks 98 being secured to each end of the strap 97. Each hook 98 can be releasably secured to one of the strapping members 80. The range in magnitude of the maximum distance 94 between the tubular portion 86 of each strapping member 80 and the respective corner portion of tubular frame member 40, such as the corner portion 42c shown in FIG. 7, permits the respective hook 98 to releasably engage the strapping member 80, with a portion of the hook 98 being disposed in a corner opening 99 defined by the strapping member 80 and the respective corner portion, such as corner portion 42c of the tubular frame member 40. The tubular frame member 40 can cooperate with the tubular cross member 44 and the generally longitudinally extending members 46, 48 to define an upper support surface of carrier rack 12 that is suitable for supporting cargo, such as cargo 96 shown in FIG. 2.

The overall lengths of the strapping members 80, as measured along the respective longitudinal axis 92, can vary as required, depending upon the configuration of the respective one of the corner portions 42a, 42b, 42c and 42d to which the respective strapping members are secured, to maintain the desired maximum distance 94 between the tubular portion 86 of each strapping member 80 and the respective one of the corner portions 42a, 42b, 42c and 42d. For example, as shown in FIGS. 3 and 4, the length of the strapping member 80c can be greater than the length of strapping member 80d, due to the differences in configurations of corner portion 42c, to which strapping member 80c is secured, and corner portion 42d, to which strapping member 80d is secured. It will also be appreciated that the angle between the distal end surface 83 of the distal end portion 82 and the longitudinal axis 92, can be the same as or different than the angle between the distal end surface of the distal end portion 84 and the longitudinal axis 92, for any of the strapping members 80, and that these angles can vary among the strapping members 80, depending upon the configurations of the corner portions 42a, 42b, 42c and 42d.

An upper surface of the tubular frame member 40 can define a carrier plane 100 (FIG. 8). Each strapping member 80 can be sized and secured to the respective one of the corner portions 42a, 42b, 42c and 42d of the tubular frame member 40 such that each of the strapping members 80 is spaced apart from the carrier plane 100. The carrier plane 100 can be generally horizontally oriented, and each of the strapping members 80 can be below the carrier plane 100, when the carrier rack 12 is attached to a vehicle, such as vehicle 10, and is oriented to carry objects, for example when the carrier rack 12 is oriented as shown in FIG. 2. Each strapping member 80 can be sized so that both the strapping member 80 and a hook of a tie-down member, such as one of the hooks 98 of the tie-down member 95, are below the carrier plane 100 when the hook 98 is releasably secured to the strapping member 80. The outside diameter $d_2$ of the tubular portion 86 of strapping member 80 is shown to be smaller than the outside diameter $d_1$ of the tubular frame member 40. In one embodiment, a ratio of the outside diameter $d_1$ to the outside diameter $d_2$ ranges from about 1.5 to about 2.0. In another embodiment, the ratio of the outside diameter $d_1$ to the outside diameter $d_2$ ranges from about 1.6 to about 1.9. In one embodiment, a ratio of the thickness $t_1$ of the annular wall 70 of the tubular frame member 40 to the distal height $h_1$ of the first end portion 82 of strapping member 80, and a ratio of the thickness $t_1$ of the annular wall 70 to the distal height $h_2$ of the second end portion 84 of strapping member 80, each ranges from about 0.5 to about 0.7.

A lower surface of the tubular frame member 40 can define a lower plane 102 (FIG. 8). As shown in FIG. 8, with respect to strapping member 80c, each of the strapping members 80 can be spaced apart from the lower plane 102 and can be located between the lower plane 102 and the carrier plane 100. The lower plane 102 can be generally horizontally oriented and each of the strapping members 80 can be above the lower plane 102 when the carrier rack 12 is attached to a vehicle, such as vehicle 10, and is oriented to carry objects, for example when the carrier rack 12 is oriented as shown in FIG. 2.

Figure 11:
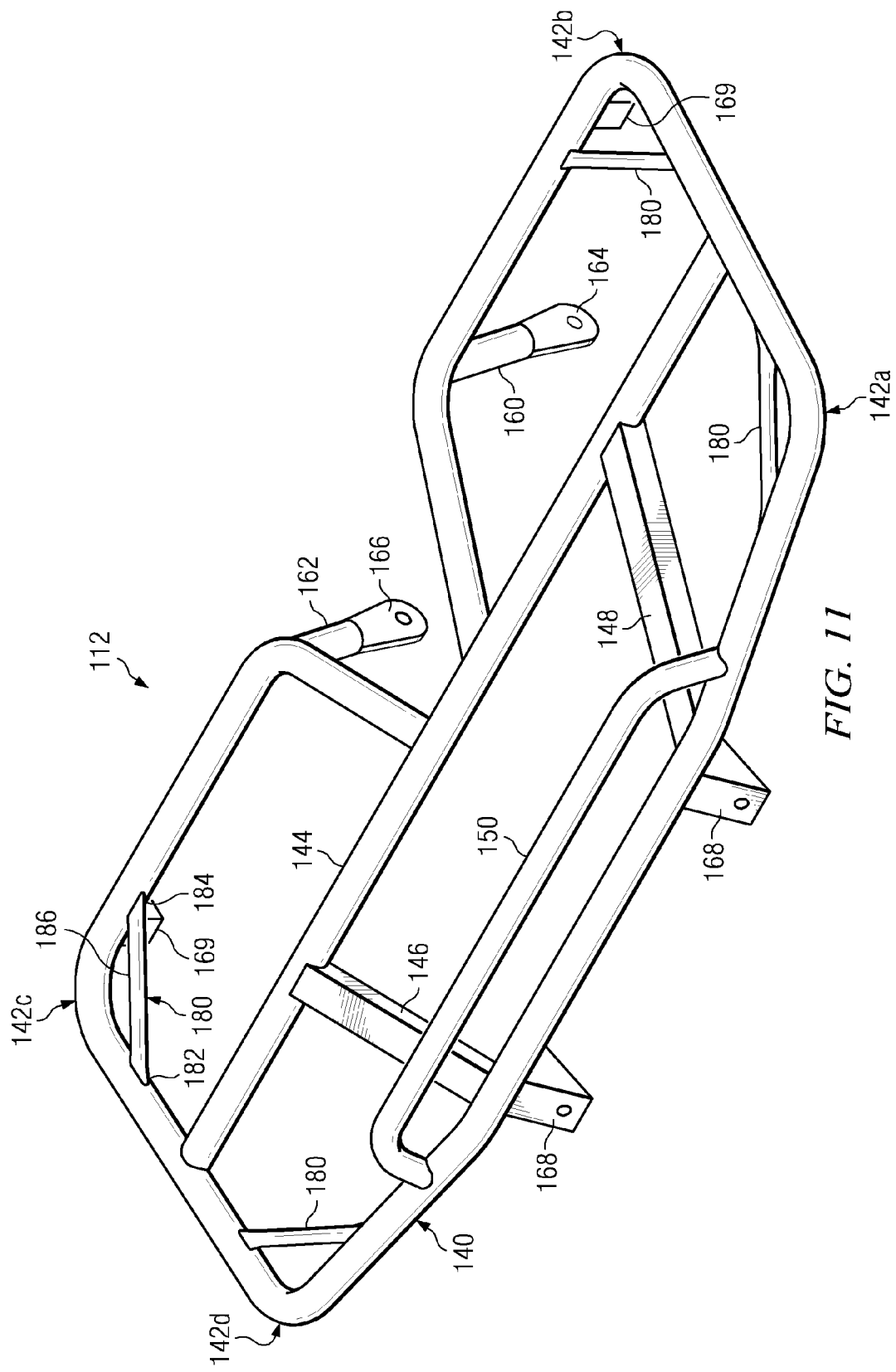
FIG. 11 is a perspective view of the carrier rack shown in FIGS. 1 and 2 that is secured to the front portion of the vehicle.
Figure 14:
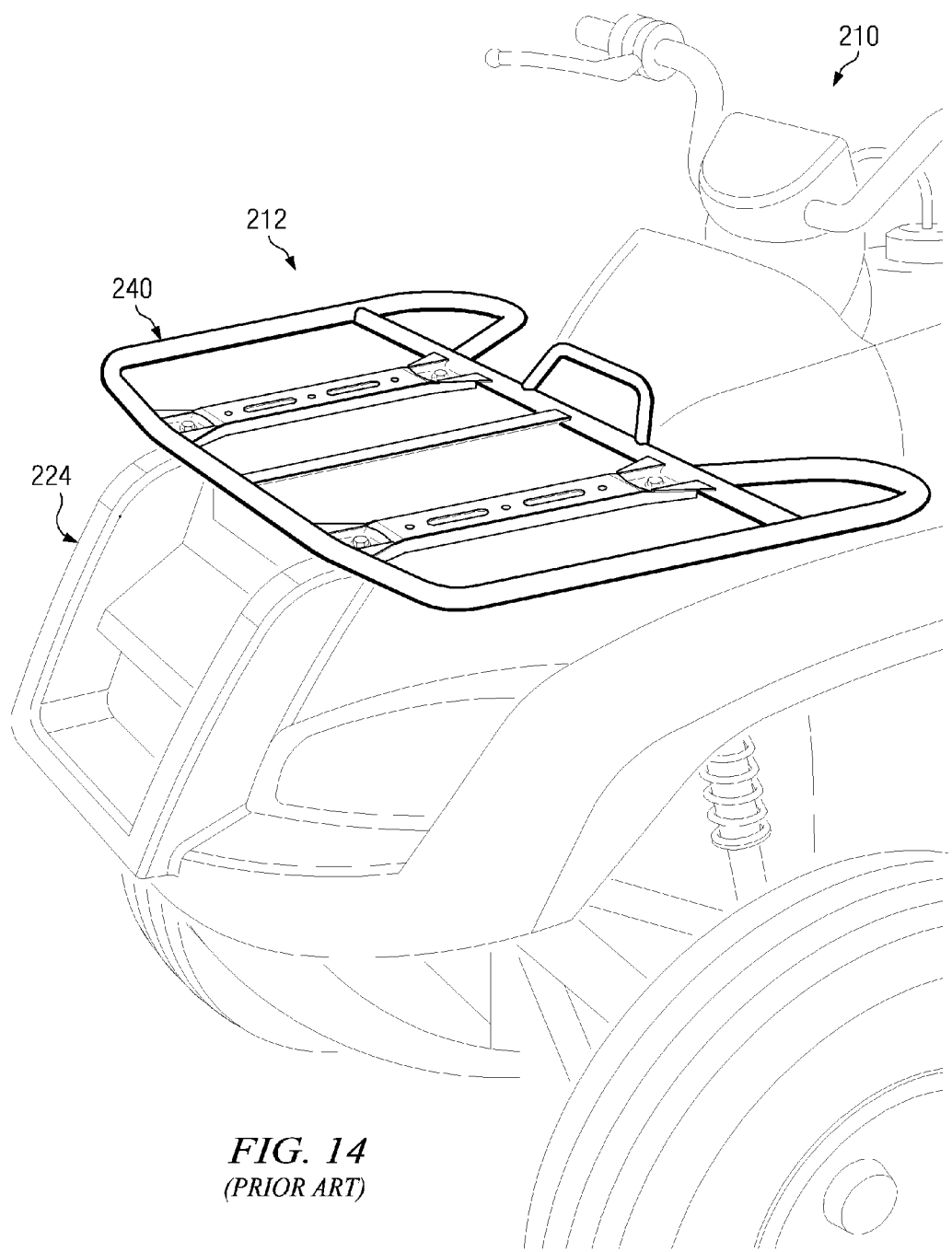
FIG. 14 is a perspective view of a front portion of an all terrain vehicle (ATV), wherein a Prior Art carrier rack is attached to a front fender assembly of the vehicle.
Figure 15:
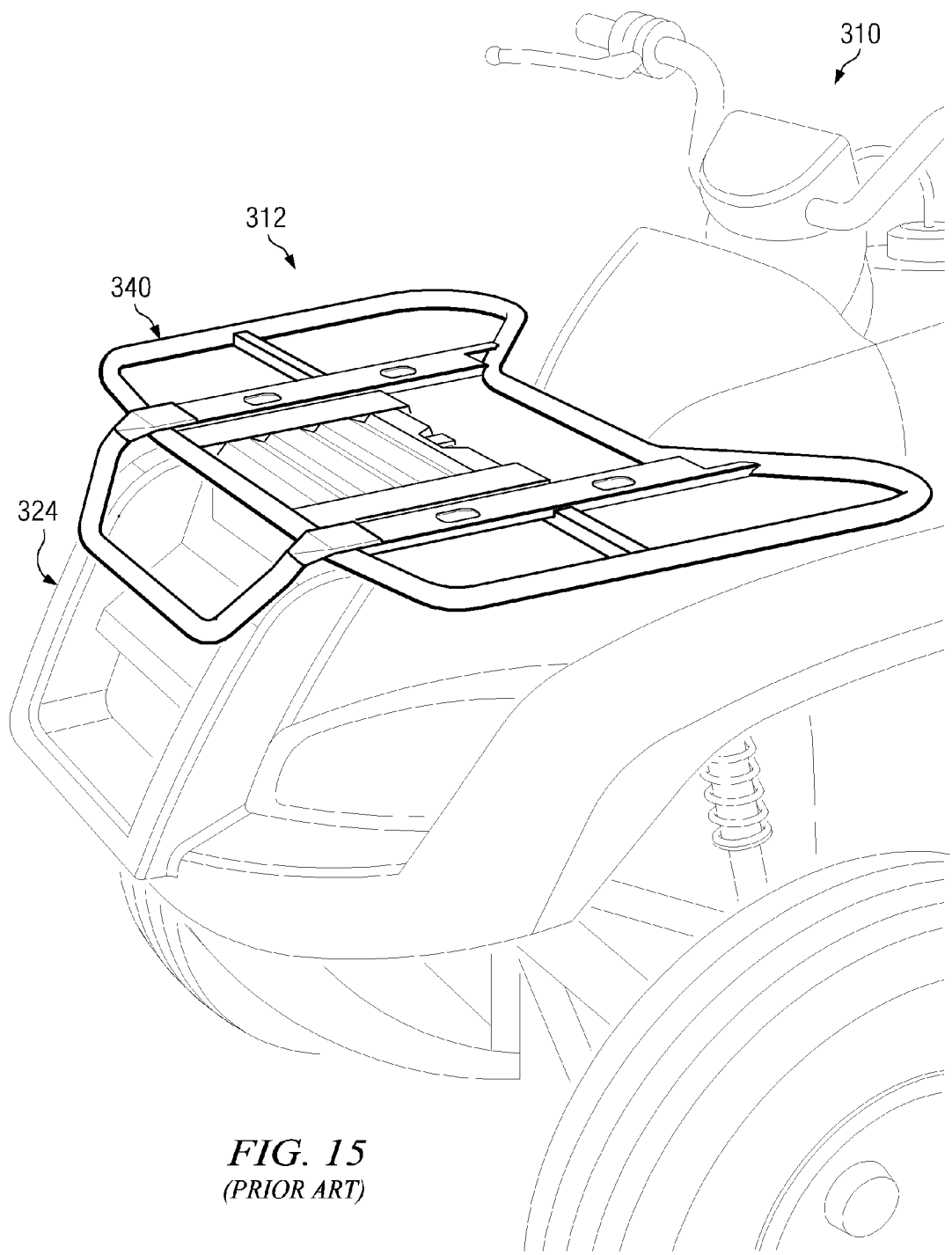
FIG. 15 is a perspective view of a front portion of an ATV, wherein another Prior Art carrier rack is attached to a front fender assembly of the vehicle.
Figure 16:
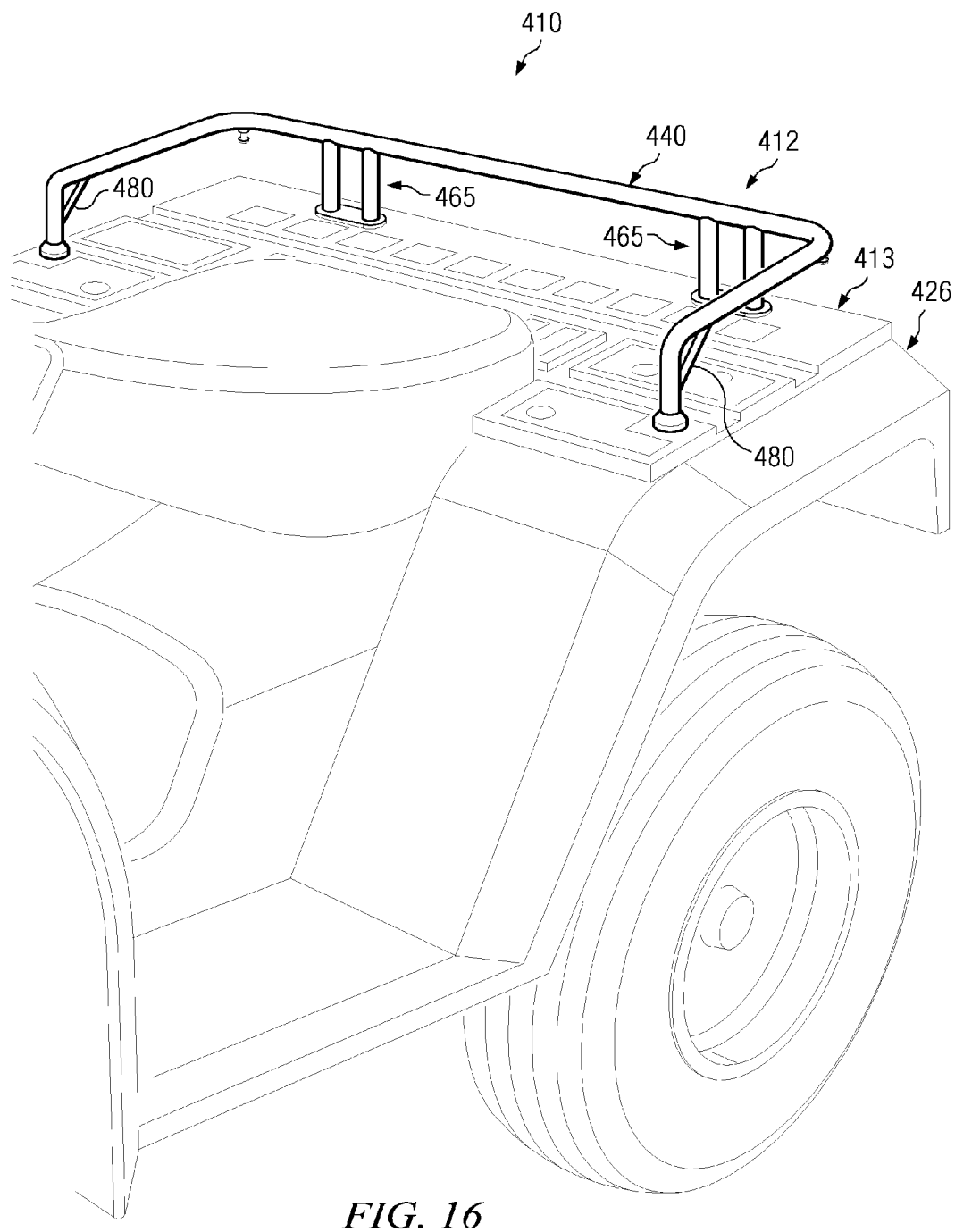
FIG. 16 is a perspective view of a rear portion of an ATV, wherein yet another Prior Art carrier rack is attached to a rear fender assembly of the vehicle.

FIGS. 11-13 further illustrate the carrier rack 112, which can be secured to and supported by front fender assembly 24 and/or frame 18. The carrier rack 112 can be positioned adjacent the front fender assembly 24 as shown in FIGS. 1 and 2. The carrier rack 112 can include a tubular frame member 140 that defines an outer perimeter $P_2$ of the carrier rack 112. The tubular frame member 140 can include a plurality of corner portions. For example, the tubular frame member 140 can include four corner portions, designated 142a, 142b, 142c, and 142d in FIGS. 11 and 12. Each of the corner portions 142a, 142b, 142c and 142d can partially define the outer perimeter $P_2$.

The carrier rack 112 can also include other members, that can be tubular members having various cross-sectional shapes, which are interconnected with one another and with the tubular frame member 140. For example, as shown in FIGS. 11 and 12, carrier rack 112 can include a tubular cross-member 144 that extends laterally between opposite side portions of the tubular frame member 140. Each end of the tubular cross member 144 can be secured to the tubular frame member by conventional means, such as welding. Carrier rack 112 can also include generally longitudinally extending members 146 and 148, which can be tubular members, with one end of each of the generally longitudinally extending members 146, 148 being secured, for example by welding, to the tubular frame member 140, and the opposite end of each of the generally longitudinally extending members 146, 148 being secured, for example by welding, to the tubular cross member 144.

A laterally extending forward tubular member 150 can be secured at opposite ends to the tubular frame member 140, for example by welding, and can extend above the tubular frame member 140 as shown in FIGS. 11 and 13. The forward tubular member 150 can act as a stop to facilitate preventing cargo carried by the carrier rack 112 from moving forward off of the carrier rack 112. Carrier rack 112 can also include rear mount arms 160, 162 that can terminate in distal eyelets 164, 166, respectively, that can be used to attach carrier rack 112 to the front fender assembly 24 and/or the frame 18. Carrier rack 112 can also include one or more spacers 168 (two shown) that can engage and/or be secured to a forward portion of the tubular frame member 140 and that can be used to secure carrier rack 112 to the front fender assembly 24 and/or frame 18. The carrier rack 112 can also include one or more spacers 169 that can be secured to tubular frame member 140 and that can engage and/or can be secured to the front fender assembly 24 and/or frame 18.

The tubular frame member 140 can be made from round tubing, such that the tubular frame member has a generally circular cross-sectional shape. In other embodiments, tubular frame members can be provided that are made from tubes having other cross-sectional shapes, such as square or rectangular cross-sectional shapes. Tubular frame member 140 can include an outside cross-sectional dimension, which, in the embodiment shown in FIGS. 11-13, is an outside diameter of the tubular frame member 140. The tubular frame member 140 can include an annular wall that defines a hollow interior, with the annular wall having a thickness. In one embodiment, the outside diameter of the tubular frame member 140 can range from about 17 mm to about 21 mm. In another embodiment, the outside diameter of the tubular frame member 140 can be about 19.1 mm. In one embodiment, the thickness of the annular wall of the tubular frame member 140 can range from about 1.2 mm to about 1.6 mm. In one embodiment, the wall thickness of the annular wall of the tubular frame member 140 can be about 1.4 mm.

The carrier rack 112 can also include a plurality of strapping members 180, with each of the strapping members 180 being secured to a respective one of the corner portions 142a, 142b, 142c and 142d, of the tubular frame member 140. Each of the strapping members 180 can have the same, or a similar configuration as the configuration of the strapping member 80 of carrier rack 12. For example, each of the strapping members 180 can have first and second end portions 182, 184, which can be stamped or crimped, and a tubular portion 186 intermediate and integral with the first and second end portions 182, 184. The tubular portion 186 of strapping member 180 can include an annular wall having a thickness, with the annular wall defining a hollow interior such that the tubular portion 186 has a generally circular cross-sectional shape. In one embodiment, the thickness of the annular wall of the tubular portion 186 can range from about 1.0 mm to about 1.4 mm, and in another embodiment this thickness can be about 1.2 mm.

Each strapping member 180 can have an outside cross-sectional dimension, which, in the embodiment shown in FIGS. 11-13 can be an outside diameter of the tubular portion 186 of the strapping member 180. In one embodiment, the outside diameter of the tubular portion 186 of strapping member 180 can range from about 10.0 mm to about 14.0 mm. In another embodiment, the outside diameter of the tubular portion 186 of strapping member 180 can be about 12.0 mm. The outside diameter of the tubular portion 186 of strapping member 180 can be smaller than the outside diameter of the tubular frame member 140. In one embodiment, a ratio of the outside diameter of the tubular frame member 140 to the outside diameter of the tubular portion 186 of strapping member 180 ranges from about 1.5 to about 2.0. In another embodiment, this ratio ranges from about 1.6 to about 1.9.

A distal end surface of each of the end portions 182, 184 of the strapping member 180 can be elongated and substantially flat. The configuration of the distal end surfaces of the strapping member 180 in cooperation with a distal height of each of the end portions 182, 184, with each of the distal heights being less than the outside diameter of the tubular frame member 140, facilitates efficient welding of each of the end portions 182, 184 of each strapping member 180 to the respective corner portion of the tubular frame member 140, for example corner portion 142c shown in FIGS. 11 and 12. Each strapping member 180 can be secured to the tubular frame member 140 such that the magnitude of a maximum distance between the tubular portion 186 of each strapping member 180 and the respective corner portion of the tubular frame member 140 ranges from about 19 mm to about 35 mm. This spacing permits the carrier rack 112 to accommodate conventional hooks, clasps, or the like, that are attached to tie-down members, such as straps, cords, or the like. For example, as shown in FIG. 2, a pair of tie-down members 195 can be used to secure cargo 196, shown to be a sleeping bag, to carrier rack 112. Each tie-down member 195 can include a strap 197 and a pair of generally S-shaped hooks 198, with one of the hooks 198 being secured to each end of the strap 197. Each hook 198 can be releasably secured to one of the strapping members 180, which releasably secures cargo 190 to the carrier rack 112. A portion of each hook 198 can be disposed in a corner opening 199 defined by the associated strapping member 180 and the tubular frame member 140. Similar to the strapping members 80, the overall lengths of the strapping members 180, as well as the angular orientations of the distal end surfaces relative to the longitudinal axis of the respective strapping member 180, can vary as required depending upon the configuration of the respective one of the corner portions 142a, 142b, 142c and 142d, to which the strapping members are welded.

An upper surface of the tubular frame member 140 defines a carrier plane. Each of the strapping members 180 can be sized and secured to the respective one of the corner portions of the tubular frame member 140 such that each of the strapping members 180 is spaced apart from the carrier plane. The carrier plane can be generally horizontally oriented and each of the strapping members 180 can be below the carrier plane, when the carrier rack 112 is attached to a vehicle, such as vehicle 10, and is oriented to carry objects, for example, when the carrier rack 112 is oriented as shown in FIG. 2. In one embodiment, a ratio of the thickness of the annular wall of the tubular frame member 140 to the distal height of either of the end portions of the strapping member 180 ranges from about 0.5 mm to about 0.7 mm.

A lower surface of the tubular frame member 140 can define a lower plane. Each of the strapping members 180 can be spaced apart from the lower plane such that each of the strapping members 180 is between the carrier plane and the lower plane. The lower plane can be generally horizontally oriented and each of the strapping members 180 can be above the lower plane, when the carrier rack 112 is attached to a vehicle, such as vehicle 10, and is oriented to carry objects, for example, when the carrier rack 112 is oriented as shown in FIG. 2.

The use of carrier racks as described above (e.g., 12, 112) can result in several advantages. For example, the permissible variation in size of the cargo to be secured to the carrier rack is enhanced since the strapping members and the hooks of the tie-down members that are releasably secured to respective strapping members do not extend above the carrier plane defined by the upper surface of the tubular frame member of the rack, and accordingly do not typically interfere with or contact cargo resting upon the rack. The presence of the strapping members at each of four corners permits cargo of many different sizes, shapes and orientations to be strapped down, and from multiple directions. The tubular construction of the strapping members is light weight, for example as compared to solid rods of the same size, and produces the desired mechanical strength, which can be superior to the mechanical strength of the tie-down wires used on some conventional carrier racks. The stamped or crimped ends of the strapping members facilitates efficient and effective welding of the strapping members to the tubular frame member.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the general inventive principles.

What is claimed is:

1. A carrier rack for a vehicle comprising:
a tubular frame member comprising at least four corner portions, the tubular frame member defining an outer perimeter of the carrier rack, each of the corner portions partially defining the outer perimeter; and
a plurality of strapping members, each of the strapping members comprising a first end portion, a second end portion and a tubular portion intermediate the first and second end portions; wherein
each of the strapping members is secured, at each of the first and second end portions, to a respective one of the corner portions of the tubular frame member and is positioned entirely interior of the outer perimeter of the carrier rack, each of the strapping members cooperating with the respective one of the corner portions of the tubular frame member to define a corner opening;
the tubular frame member defines a carrier plane, each of the strapping members being spaced apart from the carrier plane; and
the carrier plane is generally horizontally oriented, and each of the strapping members is below the carrier plane, when the carrier rack is attached to a vehicle and oriented to carry objects.

2. The carrier rack of claim 1, wherein:
each of the strapping members further comprises a longitudinal axis; and
for each of the strapping members, a maximum distance between the longitudinal axis and the respective corner portion, as measured in a direction substantially perpendicular to the longitudinal axis, ranges from about 19 mm to about 35 mm.

3. The carrier rack of claim 2, wherein:
the tubular frame member further comprises an outside cross-sectional dimension;
the tubular portion of each of the strapping members comprises an outside cross-sectional dimension; and
for each of the strapping members, a ratio of the outside cross-sectional dimension of the tubular frame member to the outside cross-sectional dimension of the tubular portion of the strapping member ranges from about 1.5 to about 2.0.

4. The carrier rack of claim 3, wherein:
for each of the strapping members, the ratio of the outside cross-sectional dimension of the tubular frame member to the outside cross-sectional dimension of the tubular portion of the strapping member ranges from about 1.6 to about 1.9.

5. The carrier rack of claim 3, wherein:
the tubular frame member has a first generally circular cross-sectional shape and further comprises a first annular wall defining a first hollow interior, the first annular wall having a first thickness;
the tubular portion of each of the strapping members has a second generally circular cross-sectional shape and further comprises a second annular wall defining a second hollow interior, the second annular wall having a second thickness;
the outside cross-sectional dimension of the tubular frame member is an outside diameter of the tubular frame member and, for each of the strapping members, the outside cross-sectional dimension of the tubular portion of the strapping member is an outside diameter of the tubular portion of the strapping member.

6. A carrier rack for a vehicle comprising:
a tubular frame member comprising at least four corner portions, the tubular frame member defining an outer perimeter of the carrier rack, each of the corner portions partially defining the outer perimeter; and
a plurality of strapping members, each of the strapping members comprising a first end portion, a second end portion and a tubular portion intermediate the first and second end portions; wherein
each of the strapping members is secured, at each of the first and second end portions, to a respective one of the corner portions of the tubular frame member and is positioned entirely interior of the outer perimeter of the carrier rack, each of the strapping members cooperating with the respective one of the corner portions of the tubular frame member to define a corner opening;
the tubular frame member defines a carrier plane, each of the strapping members being spaced apart from the carrier plane;
the carrier plane is generally horizontally oriented, and each of the strapping members is below the carrier plane, when the carrier rack is attached to a vehicle and oriented to carry objects;
each of the strapping members further comprises a longitudinal axis;
for each of the strapping members, a maximum distance between the longitudinal axis and the respective corner portion, as measured in a direction substantially perpendicular to the longitudinal axis, ranges from about 19 mm to about 35 mm;
the tubular frame member further comprises an outside diameter;
the tubular portion of each of the strapping members comprises an outside diameter;
for each of the strapping members, a ratio of the outside diameter of the tubular frame member to the outside diameter of the tubular portion of the strapping member ranges from about 1.5 to about 2.0;
the tubular frame member has a first generally circular cross-sectional shape and further comprises a first annular wall defining a first hollow interior, the first annular wall having a first thickness;
the tubular portion of each of the strapping members has a second generally circular cross-sectional shape and further comprises a second annular wall defining a second hollow interior, the second annular wall having a second thickness;
the first end portion of each of the strapping members has a first distal height;
the second end portion of each of the strapping members has a second distal height;

for each of the strapping members, each of the first distal height and the second distal height is less than the outside diameter of the tubular portion of the strapping member;

for each of the strapping members, a ratio of the first thickness of the first annular wall of the tubular frame member to the first distal height ranges from about 0.5 to about 0.7; and for each of the strapping members, a ratio of the first thickness of the first annular wall of the tubular frame member to the second distal height ranges from about 0.5 to about 0.7.

7. The carrier rack of claim 1, wherein:
the first end portion and the second end portion of each of the strapping members is welded to the respective corner portion of the tubular frame member.

8. The carrier rack of claim 7, wherein:
each of the strapping members is generally straight.

9. The carrier rack of claim 1, wherein;
the tubular frame member defines a lower plane; and, each of the strapping members is between the carrier plane and the lower plane.

10. A vehicle comprising:
a frame;
a body structure supported by the frame; and
a carrier rack supported by at least one of the frame and the body structure, wherein the carrier rack comprises:
a tubular frame member comprising at least four corner portions, the tubular frame member defining an outer perimeter of the carrier rack, each of the corner portions partially defining the outer perimeter; and
a plurality of strapping members, each of the strapping members comprising a first end portion, a second end portion and a tubular portion intermediate the first and second end portions; wherein
each of the strapping members is secured, at each of the first and second end portions, to a respective one of the corner portions of the tubular frame member and is positioned entirely interior of the outer perimeter of the carrier rack, each of the strapping members cooperating with the respective one of the corner portions of the tubular frame member to define a corner opening;
the tubular frame member defines a carrier plane; and
the carrier plane is generally horizontally oriented and each of the strapping members is below the carrier plane.

11. The vehicle of claim 10, wherein:
each of the strapping members further comprises a longitudinal axis; and
for each of the strapping members, a maximum distance between the longitudinal axis and the respective corner portion, as measured in a direction substantially perpendicular to the longitudinal axis, ranges from about 19 mm to about 35 mm.

12. The vehicle of claim 11, wherein:
the tubular frame member further comprises an outside cross-sectional dimension;
the tubular portion of each of the strapping members comprises an outside cross-sectional dimension; and
for each of the strapping members, a ratio of the outside cross-sectional dimension of the tubular frame member to the outside cross-sectional dimension of the tubular portion of the strapping member ranges from about 1.5 to about 2.0.

13. The vehicle of claim 12, wherein:
for each of the strapping members, the ratio of the first outside cross-sectional dimension of the tubular frame member to the second outside cross-sectional dimension of the tubular portion of the strapping member ranges from about 1.6 to about 1.9.

14. The vehicle of claim 12, wherein:
the tubular frame member has a first generally circular cross-sectional shape and further comprises a first annular wall defining a first hollow interior, the first annular wall having a first thickness;
the tubular portion of each of the strapping members has a second generally circular cross-sectional shape and further comprises a second annular wall defining a second hollow interior, the second annular wall having a second thickness;
the outside cross-sectional dimension of the tubular frame member is an outside diameter of the tubular frame member and, for each of the strapping members, the outside cross-sectional dimension of the tubular portion of the strapping member is an outside diameter of the tubular portion of the strapping member.

15. A vehicle comprising:
a frame.
a body structure supported by the frame; and
a carrier rack supported by at least one of the frame and the body structure, wherein the carrier rack comprises:
a tubular frame member comprising at least four corner portions, the tubular frame member defining an outer perimeter of the carrier rack, each of the corner portions partially defining the outer perimeter; and
a plurality of strapping members, each of the strapping members comprising a first end portion, a second end portion and a tubular portion intermediate the first and second end portions; wherein
each of the strapping members is secured, at each of the first and second end portions, to a respective one of the corner portions of the tubular frame member and is positioned entirely interior of the outer perimeter of the carrier rack, each of the strapping members cooperating with the respective one of the corner portions of the tubular frame member to define a corner opening;
the tubular frame member defines a carrier plane;
the carrier plane is generally horizontally oriented and each of the strapping members is below the carrier plane;
each of the strapping members further comprises a longitudinal axis;
for each of the strapping members, a maximum distance between the longitudinal axis and the respective corner portion, as measured in a direction substantially perpendicular to the longitudinal axis, ranges from about 19 mm to about 35 mm;
the tubular frame member further comprises an outside diameter;
the tubular portion of each of the strapping members comprises an outside diameter;
for each of the strapping members, a ratio of the outside diameter of the tubular frame member to the outside diameter of the tubular portion of the strapping member ranges from about 1.5 to about 2.0;
the tubular frame member has a first generally circular cross-sectional shape and further comprises a first annular wall defining a first hollow interior, the first annular wall having a first thickness;
the tubular portion of each of the strapping members has a second generally circular cross-sectional shape and further comprises a second annular wall defining a second hollow interior, the second annular wall having a second thickness;
the first end portion of each of the strapping members has a first distal height;

the second end portion of each of the strapping members has a second distal height;

for each of the strapping members, a ratio of the first thickness of the first annular wall of the tubular frame member to the first distal height ranges from about 0.5 to about 0.7; and for each of the strapping members, a ratio of the first thickness of the first annular wall of the tubular frame member to the second distal height ranges from about 0.5 to about 0.7.

16. The vehicle of claim 10, wherein:

the first end portion and the second end portion of each of the strapping members is welded to the respective corner portion of the tubular frame member.

17. The vehicle of claim 16, wherein:

each of the strapping members is generally straight.

18. The vehicle of claim 10, wherein:

the body structure comprises a fender assembly and the carrier rack is adjacent to the fender assembly.

19. The vehicle of claim 18, being a saddle-type vehicle, the vehicle further comprising:

at least one rotatable front wheel coupled to the frame;

at least one rotatable rear wheel coupled to the frame; and a source of motive power supported by the frame and coupled to at least one of the front and rear wheels; wherein the fender assembly is adjacent to at least one of the front and rear wheels.

20. A saddle-type vehicle comprising:

a frame;

at least one rotatable front wheel coupled to the frame;

at least one rotatable rear wheel coupled to the frame;

a source of motive power supported by the frame and coupled to at least one of the front and rear wheels;

a body structure supported by the frame and comprising a fender assembly, the fender assembly being adjacent to at least one of the front and rear wheels; and a carrier rack supported by at least one of the frame and the body structure, the carrier rack being adjacent to the fender assembly, wherein the carrier rack comprises:

a tubular frame member comprising at least four corner portions, the tubular frame member defining an outer perimeter of the carrier rack, each of the corner portions partially defining the outer perimeter; and a plurality of strapping members, each of the strapping members being generally straight and comprising a first end portion, a second end portion and a tubular portion intermediate the first and second end portions; wherein the first end portion and the second end portion of each of the strapping members is welded to a respective one of the corner portions of the tubular frame member and is positioned entirely interior of the outer perimeter of the carrier rack, each of the strapping members cooperating with the respective one of the corner portions of the tubular frame member to define a corner opening;

the tubular frame member defines a carrier plane and a lower plane;

the carrier plane is generally horizontally oriented and each of the strapping members is below the carrier plane and above the lower plane;

each of the strapping members further comprises a longitudinal axis; and for each of the strapping members, a maximum distance between the longitudinal axis and the respective corner portion, as measured in a direction substantially perpendicular to the longitudinal axis, ranges from about 19 mm to about 35 mm;

the tubular frame member further comprises an outside diameter;

the tubular portion of each of the strapping members comprises an outside diameter; and for each of the strapping members, a ratio of the outside diameter of the tubular frame member to the outside diameter of the tubular portion of the strapping member ranges from about 1.5 to about 2.0;

the tubular frame member has a first generally circular cross-sectional shape and further comprises a first annular wall defining a first hollow interior, the first annular wall having a first thickness;

the tubular portion of each of the strapping members has a second generally circular cross-sectional shape and further comprises a second annular wall defining a second hollow interior, the second annular wall having a second thickness;

the first end portion of each of the strapping members has a first distal height;

the second end portion of each of the strapping members has a second distal height;

for each of the strapping members, each of the first distal height and the second distal height is less than the outside diameter of the tubular portion of the strapping member;

for each of the strapping members, a ratio of the first thickness of the first annular wall of the tubular frame member to the first distal height ranges from about 0.5 to about 0.7; and for each of the strapping members, a ratio of the first thickness of the first annular wall of the tubular frame member to the second distal height ranges from about 0.5 to about 0.7.

21. A carrier rack for a vehicle comprising:

a tubular frame member comprising at least four corner portions, the tubular frame member defining an outer perimeter of the carrier rack, each of the corner portions partially defining the outer perimeter; and a plurality of strapping members, each of the strapping members comprising a first end portion, a second end portion and a tubular portion intermediate the first and second end portions; wherein each of the strapping members is secured, at each of the first and second end portions, to a respective one of the corner portions of the tubular frame member and is positioned entirely interior of the outer perimeter of the carrier rack, each of the strapping members cooperating with the respective one of the corner portions of the tubular frame member to define a corner opening;

the tubular frame member defines a carrier plane, each of the strapping members being spaced apart from the carrier plane; and the carrier plane is generally horizontally oriented, and each of the strapping members is below the carrier plane, when the carrier rack is attached to a vehicle and oriented to carry objects;

the tubular frame member further comprises an outside diameter and a first annular wall defining a first hollow interior, the first annular wall having a first thickness;

the tubular portion of each of the strapping members comprises an outside diameter and a second annular wall defining a second hollow interior, the second annular wall having a second thickness;

the first end portion of the each of the strapping members has a first distal height;

the second end portion of each of the strapping members has a second distal height;

for each of the strapping members, each of the first distal height and the second distal height is less than the outside diameter of the tubular portion of the strapping member;

for each of the strapping members, a ratio of the first thickness of the first annular wall of the tubular frame member to the first distal height ranges from about 0.5 to about 0.7; and for the each of the strapping members, a ratio of the first thickness of the first annular wall of the tubular frame member to the second distal height ranges from about 0.5 to about 0.7.

22. The carrier rack of claim 21, wherein:

at least of one of the strapping members is generally horizontally oriented when the carrier rack is attached to a vehicle and oriented to carry objects.

23. The carrier rack of claim 1, wherein:

at least of one of the strapping members is generally horizontally oriented when the carrier rack is attached to a vehicle and oriented to carry objects.

* * * * *

UNITED STATES PATENT AND TRADEMARK OFFICE
CERTIFICATE OF CORRECTION

PATENT NO. : 8,096,582 B2
APPLICATION NO. : 12/473430
DATED : January 17, 2012
INVENTOR(S) : Kelly Ann Longwell et al.

It is certified that error appears in the above-identified patent and that said Letters Patent is hereby corrected as shown below:

Column 6, line 25, change --Of-- to "of";
Claim 13, column 13, line 65, delete "first";
Claim 13, column 13, line 67, delete "second"; and
Claim 15, column 14, line 20, change "frame." to --frame;--.

Signed and Sealed this
Twenty-seventh Day of March, 2012

David J. Kappos
*Director of the United States Patent and Trademark Office*